United States Patent
Tang et al.

(10) Patent No.: US 12,205,269 B2
(45) Date of Patent: Jan. 21, 2025

(54) METHOD AND DEVICE FOR DETECTING DISPLAY PANEL DEFECT

(71) Applicant: BOE TECHNOLOGY GROUP CO., LTD., Beijing (CN)

(72) Inventors: Hao Tang, Beijing (CN); Ronghua Lan, Beijing (CN); Jiuyang Cheng, Beijing (CN); Shuo Zhou, Beijing (CN); Zhong Huang, Beijing (CN); Guo Jiang, Beijing (CN); Li Wang, Beijing (CN); Lijia Zhou, Beijing (CN); Zhidong Wang, Beijing (CN); Lirong Xu, Beijing (CN); Quanguo Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 315 days.

(21) Appl. No.: 17/784,073

(22) PCT Filed: Jun. 11, 2021

(86) PCT No.: PCT/CN2021/099727
§ 371 (c)(1),
(2) Date: Jun. 9, 2022

(87) PCT Pub. No.: WO2022/012240
PCT Pub. Date: Jan. 20, 2022

(65) Prior Publication Data
US 2023/0005130 A1    Jan. 5, 2023

(30) Foreign Application Priority Data

Jul. 16, 2020 (CN) .......................... 202010686184.7

(51) Int. Cl.
*G06T 7/00* (2017.01)
*G06V 10/25* (2022.01)
*G06V 10/26* (2022.01)

(52) U.S. Cl.
CPC ............ *G06T 7/0004* (2013.01); *G06V 10/25* (2022.01); *G06V 10/26* (2022.01); *G06T 2207/30121* (2013.01)

(58) Field of Classification Search
CPC ......... G06T 7/0004; G06T 2207/30121; G06T 5/30; G06T 7/187; G06V 10/25; G06V 10/26
(Continued)

(56) References Cited

U.S. PATENT DOCUMENTS 5,917,935 A * 6/1999 Hawthorne ........... G02F 1/1309
382/141
6,154,561 A * 11/2000 Pratt ....................... G06T 7/001
348/125
(Continued)

FOREIGN PATENT DOCUMENTS

| CN | 103729632 A | 4/2014 |
| CN | 104978747 A | 10/2015 |

(Continued)

OTHER PUBLICATIONS

International Search Report and Written Opinion for Application No. PCT/CN2021/099727, dated Sep. 13, 2021, 11 Pages.
(Continued)

*Primary Examiner* — Mahendra R Patel
(74) *Attorney, Agent, or Firm* — BROOKS KUSHMAN P.C.

(57) ABSTRACT

A method for detecting a display panel defect, including: collecting a panel image of a to-be-detected display panel, a plurality of first pixels of the display panel corresponding to
(Continued)

a plurality of second pixels in the panel image; converting the panel image into a binary image; dilating each bright spot region in the binary image such that adjacent bright spot regions communicate with each other to form at least one closed communication region in the binary image; determining a region of interest mask image in the binary image in accordance with the at least one closed communication region; determining a region of interest in accordance with the region of interest mask image and the panel image; and performing feature identification on the region of interest to determine a defect of the display panel.

19 Claims, 4 Drawing Sheets

(58) Field of Classification Search
USPC .......................................................... 382/141
See application file for complete search history.

(56) References Cited

U.S. PATENT DOCUMENTS

| | | | | |
|---|---|---|---|---|
| 6,855,929 | B2 * | 2/2005 | Kimba | H01J 37/073 |
| | | | | 250/307 |
| 7,181,059 | B2 * | 2/2007 | Duvdevani | G06V 10/94 |
| | | | | 382/199 |
| 9,812,672 | B2 * | 11/2017 | Cocca | H10K 71/135 |
| 2007/0133862 | A1 * | 6/2007 | Gold | G06T 7/12 |
| | | | | 382/149 |
| 2014/0147036 | A1 * | 5/2014 | Mutsuo | G06V 30/153 |
| | | | | 382/164 |
| 2016/0034783 | A1 * | 2/2016 | Cheng | G06T 7/33 |
| | | | | 382/195 |
| 2019/0258890 | A1 * | 8/2019 | Lee | G06F 18/15 |
| 2020/0160083 | A1 * | 5/2020 | Zhu | G06N 3/08 |
| 2021/0110787 | A1 * | 4/2021 | Buckley | G06T 5/77 |
| 2022/0179325 | A1 * | 6/2022 | Hsu | G03F 7/70641 |

FOREIGN PATENT DOCUMENTS

| | | | | |
|---|---|---|---|---|
| CN | 105303189 | A | 2/2016 | |
| CN | 105405142 | A * | 3/2016 | |
| CN | 106228532 | A | 12/2016 | |
| CN | 109215026 | A * | 1/2019 | ......... G01N 21/8851 |
| CN | 109636778 | A * | 4/2019 | ........... G06T 7/0004 |
| CN | 110910318 | A | 3/2020 | |
| CN | 111353983 | A * | 6/2020 | ........... G06T 7/0006 |
| CN | 114004777 | A * | 2/2022 | |
| EP | 3594750 | A1 * | 1/2020 | ............... G03F 1/84 |
| JP | 2007093304 | A * | 4/2007 | ........... G06T 7/0004 |
| JP | 2009065101 | A * | 3/2009 | |
| JP | 2011085821 | A * | 4/2011 | |
| WO | WO-9319453 | A1 * | 9/1993 | ......... G06F 11/2221 |
| WO | WO-2018043891 | A1 * | 3/2018 | ............. B32B 23/08 |

OTHER PUBLICATIONS

First Office Action for Chinese Application No. 202010686184.7, dated Dec. 13, 2024, 9 Pages.

Sun, Haoyan, "Research on Machine Vision based Pointer Meter Reading Recognition System," Information Technology Collection of China Excellent Master's Thesis Full Text Database, Issue 9, pp. 1138-1413 (p. 27), ISSN: 1674-0246, Sep. 15, 2015, 2 Pages.

Chen, Qilin et al., "Surface Defect Detection of Stamping and Grinding Flat Plate Parts," Forging Technology, vol. 45, Issue 6, pp. 168-174, Jun. 30, 2020, 7 Pages.

* cited by examiner

METHOD AND DEVICE FOR DETECTING DISPLAY PANEL DEFECT

CROSS REFERENCE TO RELATED APPLICATIONS

This application is the U.S. national phase of PCT Application No. PCT/CN2021/099727 filed on Jun. 11, 2021, which claims priority to Chinese Patent Application No. 202010686184.7 filed on Jul. 16, 2020, which are incorporated herein by reference in their entireties.

TECHNICAL FIELD

The present disclosure relates to the field of display technology, in particular to a method and a device for detecting a display panel defect.

BACKGROUND

During the manufacture of an Organic Light-Emitting Diode (OLED) display panel, such defects as cracks occur due to a manufacturing process, and meanwhile such defects as bubbles and contaminants occur when a glass cover plate is attached onto the OLED display panel. The quality of the OLED display panel is seriously affected by these defects. When the defects are detected manually, the cost is high and the efficiency is low. In addition, it is difficult to observe many tiny defects visibly, so some defects may not be detected or detected excessively.

SUMMARY

An object of the present disclosure is to provide a method and a device for detecting a display panel defect, so as to solve the above-mentioned problems.

The present disclosure provides the following technical solutions.

In one aspect, the present disclosure provides in some embodiments a method for detecting a display panel defect, including: collecting a panel image of a to-be-detected display panel, a plurality of first pixels of the display panel corresponding to a plurality of second pixels in the panel image; converting the panel image into a binary image; dilating each bright spot region in the binary image such that adjacent bright spot regions communicate with each other to form at least one closed communication region in the binary image; determining a region of interest mask image in the binary image in accordance with the at least one closed communication region; determining a region of interest in accordance with the region of interest mask image and the panel image; and performing feature identification on the region of interest to determine a defect of the display panel.

In a possible embodiment of the present disclosure, the converting the panel image into the binary image includes: converting the panel image into a first grayscale image; performing compression on the first grayscale image to obtain a second grayscale image; and converting the second grayscale image into the binary image.

In a possible embodiment of the present disclosure, a row compression ratio for the compression on the first grayscale image is 2 to 6, and a column compression ratio for the compression on the first grayscale image is 2 to 6.

In a possible embodiment of the present disclosure, the converting the second grayscale image to the binary image includes: calculating a grayscale average value of all pixels of the second grayscale image; and setting the pixel whose grayscale value is greater than or equal to the grayscale average value as white, and setting the pixel whose grayscale value is less than the grayscale average value as black so as to obtain the binary image, or setting the pixel whose grayscale value is greater than the grayscale average value as white, and setting the pixel whose grayscale value is less than or equal to the grayscale average value as black so as to obtain the binary image.

In a possible embodiment of the present disclosure, the determining the region of interest mask image in the binary image in accordance the at least one closed communication region includes: determining a maximum communication region through calculating a perimeter of each communication region, and cutting out an image of the maximum communication region; and eroding a preset edge of the image of the maximum communication region inwardly by a preset quantity of second pixels to obtain the region of interest mask image.

In a possible embodiment of the present disclosure, the determining the region of interest in accordance with the region of interest mask image and the panel image includes: determining a transition region of interest in the second grayscale image corresponding to the region of interest mask image; and performing an AND operation on the transition region of interest and the region of interest mask image so as to obtain the region of interest.

In a possible embodiment of the present disclosure, prior to performing feature identification on the region of interest, the method further includes at least one of: performing gamma enhancement on the region of interest; filtering the region of interest; performing defective edge sharpening on the region of interest; and performing edge removal on the region of interest.

In a possible embodiment of the present disclosure, the performing the feature identification on the region of interest includes identifying a line defect and/or a bubble defect in the region of interest through Hough transform.

In a possible embodiment of the present disclosure, subsequent to identifying the line defect in the region of interest, the method further includes, when an angle between an identified line and a predetermined direction is greater than a threshold, excluding the line defect.

In another aspect, the present disclosure provides in some embodiments a device for detecting a display panel defect, including: a collection module configured to collect a panel image of a to-be-detected display panel, a plurality of first pixels of the display panel corresponding to a plurality of second pixels in the panel image; a conversion module configured to convert the panel image into a binary image; a dilation module configured to dilate each bright spot region in the binary image such that adjacent bright spot regions communicate with each other to form at least one closed communication region in the binary image; a first processing module configured to determine a region of interest mask image in the binary image in accordance with the at least one closed communication region; a second processing module configured to determine a region of interest in accordance with the region of interest mask image and the panel image; and a feature identification module configured to perform feature identification on the region of interest to determine a defect of the display panel.

In a possible embodiment of the present disclosure, the conversion module is further configured to: convert the panel image into a first grayscale image; perform compression on the first grayscale image to obtain a second grayscale image; and convert the second grayscale image into the binary image.

In a possible embodiment of the present disclosure, the conversion module is further configured to: calculate a grayscale average value of all pixels of the second grayscale image; and set the pixel whose grayscale value is greater than or equal to the grayscale average value as white, and set the pixel whose grayscale value is less than the grayscale average value as black so as to obtain the binary image, or set the pixel whose grayscale value is greater than the grayscale average value as white, and set the pixel whose grayscale value is less than or equal to the grayscale average value as black so as to obtain the binary image.

In a possible embodiment of the present disclosure, the first processing module is further configured to: determine a maximum communication region through calculating a perimeter of each communication region, and cut out an image of the maximum communication region; and erode a preset edge of the image of the maximum communication region inwardly by a preset quantity of second pixels to obtain the region of interest mask image.

In a possible embodiment of the present disclosure, the second processing module is further configured to: determine a transition region of interest in the second grayscale image corresponding to the region of interest mask image; and perform an AND operation on the transition region of interest and the region of interest mask image so as to obtain the region of interest.

In yet another aspect, the present disclosure provides in some embodiments a device for detecting a display panel defect, including a processor, and a memory storing therein an instruction. The instruction is executed by the processor so as to implement the above-mentioned method.

In still yet another aspect, the present disclosure provides in some embodiments a storage medium storing therein an instruction. The instruction is executed by a processor so as to implement the above-mentioned method.

DETAILED DESCRIPTION

In order to make the objects, the technical solutions and the advantages of the present disclosure more apparent, the present disclosure will be described hereinafter in a clear and complete manner in conjunction with the drawings and embodiments.

In the related art, there are two main detection algorithms for the automatic detection of an OLED display panel defect, i.e., an artificial intelligence analysis method whose accuracy depends on a large number of picture samples, and a machine vision method whose detection accuracy and efficiency fluctuates greatly due to a Region of Interest (ROI) extraction result.

An object of the present disclosure is to provide a method and a device for detecting a display panel defect, so as to accurately identify the display panel defect.

Figure 1:
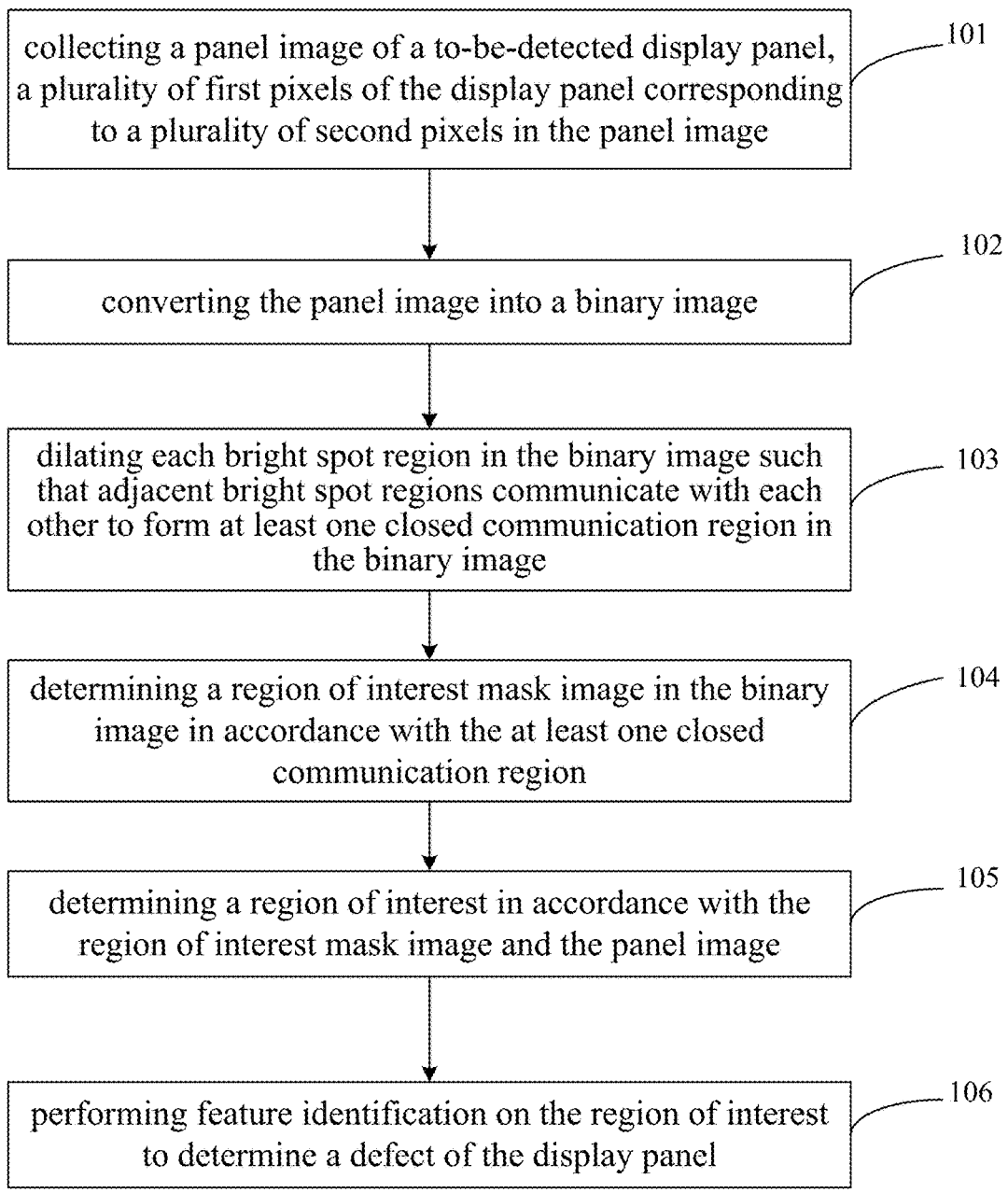
FIG. 1 is a flow chart of a method for detecting a display panel defect according to one embodiment of the present disclosure.

The present disclosure provides in some embodiments a method for detecting a display panel defect which, as shown in FIG. 1, includes the following steps.

Step 101: collecting a panel image of a to-be-detected display panel, a plurality of first pixels of the display panel corresponding to a plurality of second pixels in the panel image.

The first pixel is a pixel of the display panel, and the second pixel is a pixel of the panel image. In order to identify the display panel defect accurately, a resolution of the panel image needs to be greater than a resolution of the display panel, e.g., more than ten times the resolution of the display panel. For example, the resolution of the panel image is 2048*20000, which is 64 times the resolution of the display panel. In this way, one first pixel of the panel image corresponds to 8*8 second pixels, and the first pixel appears as a bright spot in the panel image. In order to improve the identification accuracy, the panel image may have a higher resolution, but a computational burden may increase too. In order to make a compromise between the computational burden and the accuracy, the resolution of the panel image may be 36 to 64 times the resolution of the display panel.

In the embodiments of the present disclosure, the panel image of the display panel is taken through an industrial camera and a corresponding lighting device, and then the panel image is processed for the subsequent defect identification. The collected pictures are defects of the display panel, including cracks, bubbles and contaminants.

Step 102: converting the panel image into a binary image.

Figure 2:
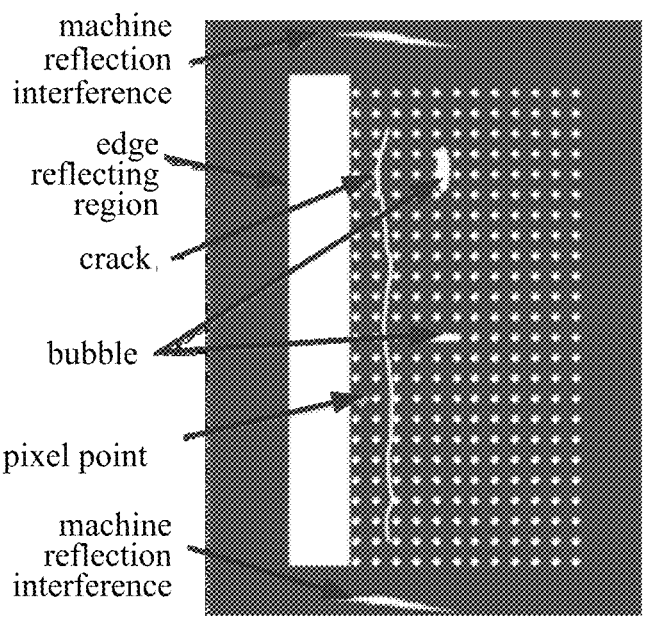
FIG. 2 is a schematic view showing a binary image obtained through converting a panel image according to one embodiment of the present disclosure.

Prior to processing the panel image, the panel image needs to be converted into a grayscale image. When the panel image is a grayscale image, this step may not be performed, and then the grayscale image is converted into the binary image in black and white. A feature in the image is white and has a grayscale value of 255, and a background is black and has a grayscale value of 0, as shown in FIG. 2. When the panel image is converted into the binary image, the panel image is further compressed so as to reduce computational burden, thereby to reduce the time for the subsequent processing.

In a possible embodiment of the present disclosure, the converting the panel image into the binary image includes: converting the panel image into a first grayscale image; performing compression on the first grayscale image to obtain a second grayscale image; and converting the second grayscale image into the binary image.

When the compression is performed on the first grayscale image to obtain the second grayscale image, considering the computational burden of the image processing and the identification accuracy, a row compression ratio for the compression on the first grayscale image is 2 to 6, and a column compression ratio for the compression on the first grayscale image is 2 to 6, so as to reduce the computational burden and ensure the identification accuracy.

In a possible embodiment of the present disclosure, the converting the second grayscale image to the binary image includes: calculating a grayscale average value of all pixels of the second grayscale image; and setting the pixel whose grayscale value is greater than or equal to the grayscale average value as white, and setting the pixel whose grayscale value is less than the grayscale average value as black so as to obtain the binary image, or setting the pixel whose grayscale value is greater than the grayscale average value as white, and setting the pixel whose grayscale value is less than or equal to the grayscale average value as black so as to obtain the binary image.

After the binarization, the pixels of the display panel, the defects, an edge reflecting region, a reflecting region not at the display panel (an interference factor, e.g., a machine where the display panel is placed) become bright spots with a grayscale value of 255, as shown in FIG. 2.

Step 103: dilating each bright spot region in the binary image such that adjacent bright spot regions communicate with each other to form at least one closed communication region in the binary image.

Figure 3:
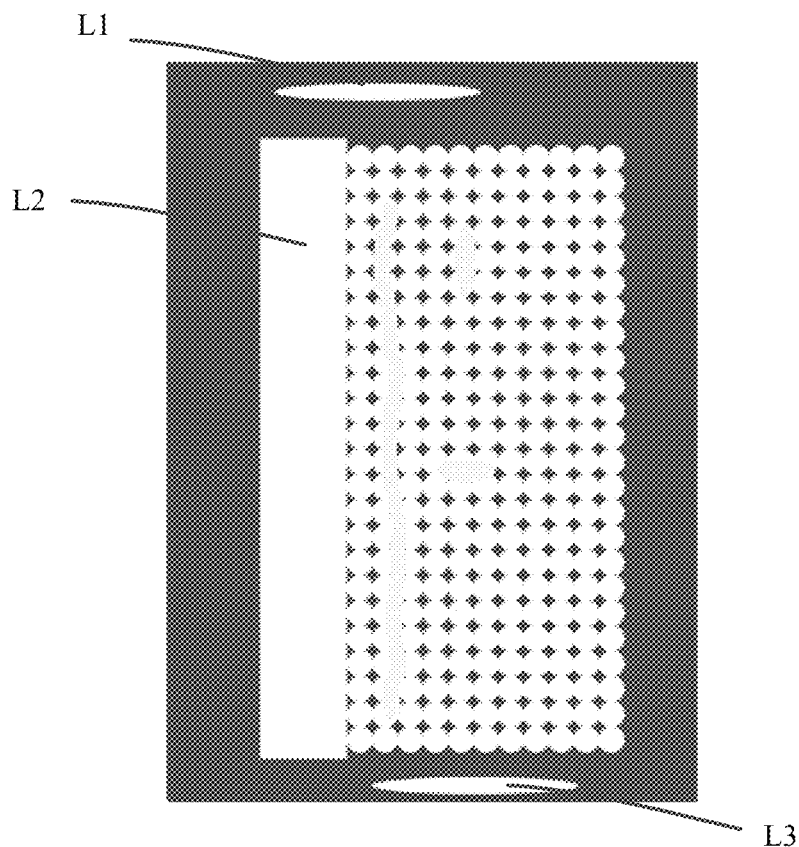
FIG. 3 is a schematic view showing a situation where a bright spot region is dilated according to one embodiment of the present disclosure.

As shown in FIG. 3, each bright spot region (namely, a white region having a grayscale value of 225) in the binary image is dilated, and each bright spot region is expanded outwardly by PixelExpandSize second pixels, i.e., a boundary of the bright spot region is expanded outwardly by PixelExpandSize second pixels with a center of the bright spot region as a reference. PixelExpandSize is a preset value, it may be adjusted according to the practical need as long as the adjacent bright spot regions communicate with each other after the dilation. In some embodiments of the present disclosure, a value of PixelExpandSize is 5 and 6. After the bright spot regions are dilated so that the adjacent bright spot regions communicate with each other, at least one closed communication region may be formed in the binary image. As shown in FIG. 3, three communication regions L1, L2 and L3 are formed in the binary image.

Step 104: determining a region of interest mask image in the binary image in accordance with the at least one closed communication region.

Figure 4:
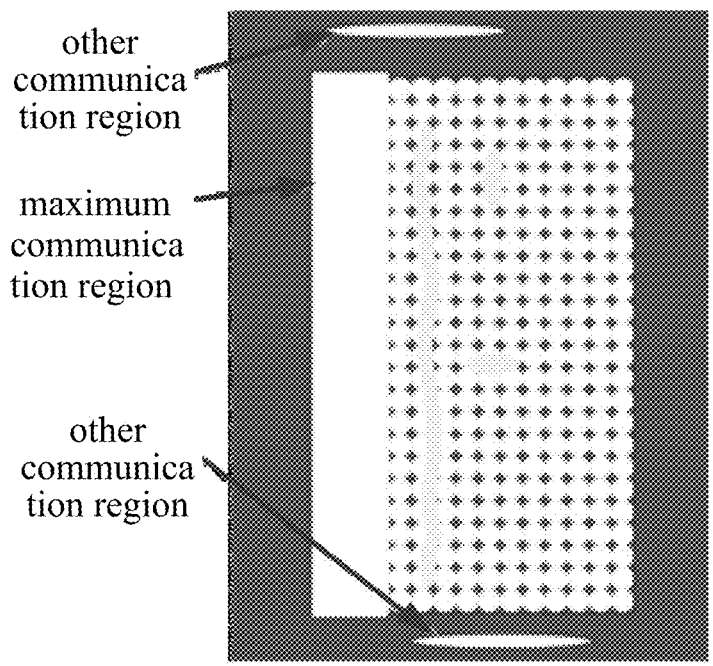
FIG. 4 is a schematic view showing a maximum communication region according to one embodiment of the present disclosure.

In the panel image, the communication region where the interference factor occurs is smaller than the communication region where a display region is located. Hence, the maximum communication region is the communication region where the display region of the display panel is located, i.e., the region where feature identification is to be performed. The maximum communication region may be determined through calculating an area of the communication region (the quantity of occupied second pixels) or a perimeter of the communication region, as shown in FIG. 4.

Figure 5:
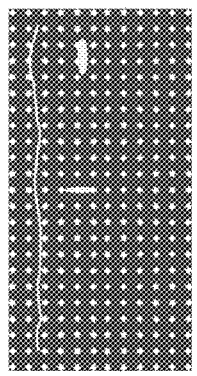
FIG. 5 is a schematic view showing a region of interest mask image according to one embodiment of the present disclosure.

An image of the maximum communication region is cut out, and a preset edge of the image of the maximum communication region is eroded inwardly by a preset quantity of second pixels, so as to prevent the identification accuracy from being adversely affected by a boundary, thereby to obtain the region of interest mask image as shown in FIG. 5. The preset value may be set according to the practical need, as long as it is able to prevent the identification accuracy from being adversely affected by the boundary, and prevent a region of interest from being adversely affected.

Step 105: determining the region of interest in accordance with the region of interest mask image and the panel image.

A transition region of interest in the second grayscale image corresponding to the region of interest mask image is determined, namely, a boundary of the transition region of interest is the same as a boundary of the region of interest mask image. In this way, it is able to remove the other region in the second grayscale image, and merely reserve the region covered by the region of interest mask image. Then, an AND operation is performed on the transition region of interest and the region of interest mask image so as to obtain the region of interest as shown in FIG. 6.

Step 106: performing feature identification on the region of interest to determine a defect of the display panel.

Figure 6:
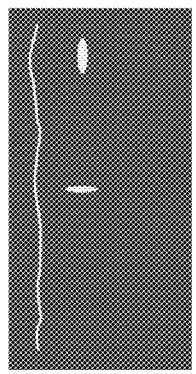
FIG. 6 is a schematic view showing a situation where a region of interest is processed according to one embodiment of the present disclosure.

The feature identification is performed on the region of interest in FIG. 6, so as to determine the defects of the display panel, including lines and circles. The line defect is a crack, and the circle defect is a bubble or contaminant.

Prior to performing the feature identification on the region of interest, the region of interest may be pre-processed to improve the identification accuracy. In a possible embodiment of the present disclosure, gamma enhancement may be performed on the region of interest so as to enhance the defect. In another possible embodiment of the present disclosure, the region of interest may be filtered to eliminate an interference bright spot as well as a pixel point of the display panel itself. In yet another possible embodiment of the present disclosure, edge sharpening may be performed on the region of interest, e.g., a grayscale value of a pixel point at an edge of a suspected region is increased through a canny operator, so as to sharpen the edge. In still yet another possible embodiment of the present disclosure, edge removal may be performed on the region of interest, e.g., an edge of the extracted ROI (i.e., the edge of the display panel) may be removed.

During the feature identification, a line defect and a bubble defect may be identified in the region of interest through Hough transform. Of course, in the embodiments of the present disclosure, the defects may be identified in the region of interest through any other defect identification algorithms.

After the identification of the line defects, the line defects may be screened. For example, when an angle between an identified line and a predetermined direction is greater than a threshold, the line defect may be excluded. Usually, the crack extends in a column direction, and when an angle between the identified line and the column direction is too large, an identification error occurs, so this line defect may be excluded. The threshold may be set according to the practical need, e.g., smaller than 30°.

According to the embodiments of the present disclosure, the panel image of the to-be-detected display panel is collected and converted into the binary image. Next, each bright spot region in the binary image is dilated so that the adjacent bright spot regions communicate with each other to form the closed communication region in the binary image. Next, the region of interest mask image in the second binary image is determined in accordance with the closed communication region, and the region of interest is determined in accordance with the region of interest mask image. Then, the feature identification is performed on the region of interest, so as to determine the defect of the display panel. As a result, it is able to extract the region of interest accurately and prevent the occurrence of any interference from a non-detected region, thereby to improve the identification accuracy.

Figure 7:
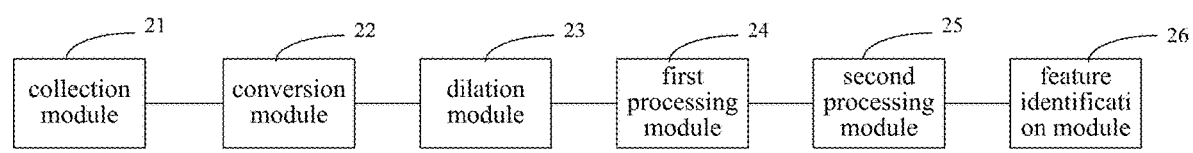
FIG. 7 is a block diagram of a device for detecting a display panel defect according to one embodiment of the present disclosure.

The present disclosure further provides in some embodiments a device for detecting a display panel defect, which includes a processor, and a memory coupled to the processor through a bus interface and storing therein programs and data for the processor. As shown in FIG. 7, the processor is configured to call the programs and data in the memory, so as to implement a collection module 21, a conversion module 22, a dilation module 23, a first processing module 24, a second processing module 25 and a feature identification module 26.

The collection module 21 is configured to collect a panel image of a to-be-detected display panel, and a plurality of first pixels of the display panel corresponds to a plurality of second pixels in the panel image.

The first pixel is a pixel of the display panel, and the second pixel is a pixel of the panel image. In order to identify the display panel defect accurately, a resolution of the panel image needs to be greater than a resolution of the display panel, e.g., more than ten times the resolution of the display panel. For example, the resolution of the panel image is 2048*20000, which is 64 times the resolution of the display panel. In this way, one first pixel of the panel image corresponds to 8*8 second pixels, and the first pixel appears as a bright spot in the panel image. In order to improve the identification accuracy, the panel image may have a higher resolution, but a computational burden may increase too. In order to make a compromise between the computational burden and the accuracy, the resolution of the panel image may be 36 to 64 times the resolution of the display panel.

In the embodiments of the present disclosure, the panel image of the display panel is taken through an industrial camera and a corresponding lighting device, and then the panel image is processed for the subsequent defect identification. The collected pictures are defects of the display panel, including cracks, bubbles and contaminants.

The conversion module 22 is configured to convert the panel image into a binary image.

Prior to processing the panel image, the panel image needs to be converted into a grayscale image. When the panel image is a grayscale image, this step may not be performed, and then the grayscale image is converted into the binary image in black and white. A feature in the image is white and has a grayscale value of 255, and a background is black and has a grayscale value of 0, as shown in FIG. 2. When the panel image is converted into the binary image, the panel image is further compressed so as to reduce computational burden, thereby to reduce the time for the subsequent processing.

In some embodiments of the present disclosure, the conversion module 22 is specifically configured to: convert the panel image into a first grayscale image; perform compression on the first grayscale image to obtain a second grayscale image; and convert the second grayscale image into the binary image.

When the compression is performed on the first grayscale image to obtain the second grayscale image, considering the computational burden of the image processing and the identification accuracy, a row compression ratio for the compression on the first grayscale image is 2 to 6, and a column compression ratio for the compression on the first grayscale image is 2 to 6, so as to reduce the computational burden and ensure the identification accuracy.

In some embodiments of the present disclosure, the conversion module 22 is specifically configured to: calculate a grayscale average value of all pixels of the second grayscale image; and set the pixel whose grayscale value is greater than or equal to the grayscale average value as white, and set the pixel whose grayscale value is less than the grayscale average value as black so as to obtain the binary image, or set the pixel whose grayscale value is greater than the grayscale average value as white, and set the pixel whose grayscale value is less than or equal to the grayscale average value as black so as to obtain the binary image.

After the binarization, the pixels of the display panel, the defects, an edge reflecting region, a reflecting region not at the display panel (an interference factor, e.g., a machine where the display panel is placed) become bright spots with a grayscale value of 255, as shown in FIG. 2.

The dilation module 23 is configured to dilate each bright spot region in the binary image such that adjacent bright spot regions communicate with each other to form at least one closed communication region in the binary image.

As shown in FIG. 3, each bright spot region (namely, a white region having a grayscale value of 225) in the binary image is dilated, and each bright spot region is expanded outwardly by PixelExpandSize second pixels, i.e., a boundary of the bright spot region is expanded outwardly by PixelExpandSize second pixels with a center of the bright spot region as a reference. PixelExpandSize is a preset value, it may be adjusted according to the practical need as long as the adjacent bright spot regions communicate with each other after the dilation. In some embodiments of the present disclosure, a value of PixelExpandSize is 5 and 6. After the bright spot regions are dilated so that the adjacent bright spot regions communicate with each other, at least one closed communication region may be formed in the binary image. As shown in FIG. 3, three communication regions L1, L2 and L3 are formed in the binary image.

The first processing module 24 is configured to determine a region of interest mask image in the binary image in accordance with the at least one closed communication region.

In the panel image, the communication region where the interference factor occurs is smaller than the communication region where a display region is located. Hence, the maximum communication region is the communication region where the display region of the display panel is located, i.e., the region where feature identification is to be performed. The maximum communication region may be determined through calculating an area of the communication region (the quantity of occupied second pixels) or a perimeter of the communication region, as shown in FIG. 4.

In some embodiments of the present disclosure, the first processing module 24 is specifically configured to: determine a maximum communication region through calculating a perimeter of each communication region, and cut out an image of the maximum communication region; and erode a preset edge of the image of the maximum communication region inwardly by a preset quantity of second pixels, so as to prevent the identification accuracy from being adversely affected by a boundary, thereby to obtain the region of interest mask image as shown in FIG. 5. The preset value may be set according to the practical need, as long as it is able to prevent the identification accuracy from being adversely affected by the boundary, and prevent a region of interest from being adversely affected.

The second processing module 25 is configured to determine a region of interest in accordance with the region of interest mask image and the panel image.

In some embodiments of the present disclosure, the second processing module 25 is specifically configured to determine a transition region of interest in the second grayscale image corresponding to the region of interest mask image is determined, namely, a boundary of the transition region of interest is the same as a boundary of the region of interest mask image. In this way, it is able to remove the other region in the second grayscale image, and merely reserve the region covered by the region of interest mask image. Then, an AND operation is performed on the transition region of interest and the region of interest mask image so as to obtain the region of interest as shown in FIG. 6.

The feature identification module 26 is configured to perform feature identification on the region of interest to determine a defect of the display panel.

The feature identification is performed on the region of interest in FIG. 6, so as to determine the defects of the display panel, including lines and circles. The line defect is a crack, and the circle defect is a bubble or contaminant.

Prior to performing the feature identification on the region of interest, the region of interest may be pre-processed to improve the identification accuracy. In a possible embodiment of the present disclosure, gamma enhancement may be performed on the region of interest so as to enhance the defect. In another possible embodiment of the present disclosure, the region of interest may be filtered to eliminate an interference bright spot as well as a pixel point of the display panel itself. In yet another possible embodiment of the present disclosure, edge sharpening may be performed on the region of interest, e.g., a grayscale value of a pixel point at an edge of a suspected region is increased through a canny operator, so as to sharpen the edge. In still yet another possible embodiment of the present disclosure, edge removal may be performed on the region of interest, e.g., an edge of the extracted ROI (i.e., the edge of the display panel) may be removed.

During the feature identification, a line defect and a bubble defect may be identified in the region of interest through Hough transform. Of course, in the embodiments of the present disclosure, the defects may be identified in the region of interest through any other defect identification algorithms.

After the identification of the line defects, the line defects may be screened. For example, when an angle between an identified line and a predetermined direction is greater than a threshold, the line defect may be excluded. Usually, the crack extends in a column direction, and when an angle between the identified line and the column direction is too large, an identification error occurs, so this line defect may be excluded. The threshold may be set according to the practical need, e.g., smaller than 30°.

According to the embodiments of the present disclosure, the panel image of the to-be-detected display panel is collected and converted into the binary image. Next, each bright spot region in the binary image is dilated so that the adjacent bright spot regions communicate with each other to form the closed communication region in the binary image. Next, the region of interest mask image in the second binary image is determined in accordance with the closed communication region, and the region of interest is determined in accordance with the region of interest mask image. Then, the feature identification is performed on the region of interest, so as to determine the defect of the display panel. As a result, it is able to extract the region of interest accurately and prevent the occurrence of any interference from a non-detected region, thereby to improve the identification accuracy.

Here, the processor may include merely one processor, or a plurality of processing elements. For example, the processor may be a Central Processing Unit (CPU), an application Specific Integrated Circuit (ASIC), or one or more ICs configured to implement the above-mentioned method, e.g., one or more Digital Signal Processors (DSPs), or one or more Field Programmable Gate Arrays (FPGAs). The memory may include merely one memory, or a plurality of storage elements.

Figure 8:
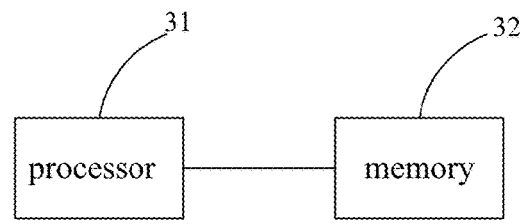
FIG. 8 is a schematic view of the device for detecting a display panel defect according to one embodiment of the present disclosure.

The present disclosure further provides in some embodiments a device for detecting a display panel defect which, as shown in FIG. 8, includes a processor 31, and a memory 32 storing therein an instruction. The instruction is executed by the processor so as to implement the above-mentioned method, which will not be particularly defined herein.

Here, the processor may include merely one processor, or a plurality of processing elements. For example, the processor may be a CPU, an ASIC, or one or more ICs configured to implement the above-mentioned method, e.g., one or more DSPs, or one or more FPGAs. The memory may include merely one memory, or a plurality of storage elements.

It should be appreciated that, the memory 32 may include a volatile memory, a nonvolatile memory or both. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM) which serves as an external high-speed cache. Illustratively but not restrictively, the RAM may include static RAM (Static RAM, SRAM), dynamic RAM (Dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), synchronous link DRAM (Synchronous Link DRAM, SLDRAM) or direct Rambus RAM (Direct Rambus RAM, DRRAM). The memory 32 intends to include, but not limited to, the above-mentioned and any other appropriate memories.

The present disclosure further provides in some embodiments a storage medium storing therein an instruction. The instruction is executed by a processor so as to implement the above-mentioned method, which will not be particularly defined herein.

The storage medium includes a computer-readable storage medium, e.g., an ROM, an RAM, a magnetic disk or an optical disk.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements. It should be further appreciated that, apart from the described or discussed order, the steps may also be performed simultaneously or in a reverse order, so as to achieve the mentioned functions. For example, new steps may be added, or some steps may be omitted or combined. In addition, the features described with reference to some embodiments may be combined in the other embodiments.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for detecting a display panel defect, comprising:
   collecting a panel image of a to-be-detected display panel, a plurality of first pixels of the display panel corresponding to a plurality of second pixels in the panel image;
   converting the panel image into a binary image;
   dilating each bright spot region in the binary image such that adjacent bright spot regions communicate with each other to form at least one closed communication region in the binary image;
   determining a region of interest mask image in the binary image in accordance with the at least one closed communication region;
   determining a region of interest in accordance with the region of interest mask image and the panel image; and
   performing feature identification on the region of interest to determine a defect of the display panel, wherein subsequent to identifying the line defect in the region of interest, the method further comprises, when an angle between an identified line and a predetermined direction is greater than a threshold, excluding the line defect.

2. The method according to claim 1, wherein the converting the panel image into the binary image comprises: converting the panel image into a first grayscale image; performing compression on the first grayscale image to obtain a second grayscale image; and converting the second grayscale image into the binary image.

3. The method according to claim 2, wherein a row compression ratio for the compression on the first grayscale image is 2 to 6, and a column compression ratio for the compression on the first grayscale image is 2 to 6.

4. The method according to claim 2, wherein the converting the second grayscale image to the binary image comprises: calculating a grayscale average value of all pixels of the second grayscale image; and setting the pixel whose grayscale value is greater than or equal to the grayscale average value as white, and setting the pixel whose grayscale value is less than the grayscale average value as black so as to obtain the binary image, or setting the pixel whose grayscale value is greater than the grayscale average value as white, and setting the pixel whose grayscale value is less than or equal to the grayscale average value as black so as to obtain the binary image.

5. The method according to claim 1, wherein the determining the region of interest mask image in the binary image in accordance the at least one closed communication region comprises: determining a maximum communication region through calculating a perimeter of each communication region, and cutting out an image of the maximum communication region; and eroding a preset edge of the image of the maximum communication region inwardly by a preset quantity of second pixels to obtain the region of interest mask image.

6. The method according to claim 2, wherein the determining the region of interest in accordance with the region of interest mask image and the panel image comprises: determining a transition region of interest in the second grayscale image corresponding to the region of interest mask image; and performing an AND operation on the transition region of interest and the region of interest mask image so as to obtain the region of interest.

7. The method according to claim 1, wherein prior to performing feature identification on the region of interest, the method further comprises at least one of: performing gamma enhancement on the region of interest; filtering the region of interest; performing defective edge sharpening on the region of interest; and performing edge removal on the region of interest.

8. The method according to claim 1, wherein the performing the feature identification on the region of interest comprises identifying a line defect and/or a bubble defect in the region of interest through Hough transform.

9. A device for detecting a display panel defect, comprising:
   a collection module configured to collect a panel image of a to-be-detected display panel, a plurality of first pixels of the display panel corresponding to a plurality of second pixels in the panel image;
   a conversion module configured to convert the panel image into a binary image;
   a dilation module configured to dilate each bright spot region in the binary image such that adjacent bright spot regions communicate with each other to form at least one closed communication region in the binary image;
   a first processing module configured to determine a region of interest mask image in the binary image in accordance with the at least one closed communication region;
   a second processing module configured to determine a region of interest in accordance with the region of interest mask image and the panel image; and
   a feature identification module configured to perform feature identification on the region of interest to determine a defect of the display panel, wherein subsequent to identifying the line defect in the region of interest, the method further comprises, when an angle between an identified line and a predetermined direction is greater than a threshold, excluding the line defect.

10. The device according to claim 9, wherein the conversion module is further configured to: convert the panel image into a first grayscale image; perform compression on the first grayscale image to obtain a second grayscale image; and convert the second grayscale image into the binary image.

11. The device according to claim 10, wherein the conversion module is further configured to: calculate a grayscale average value of all pixels of the second grayscale image; and set the pixel whose grayscale value is greater than or equal to the grayscale average value as white, and set the pixel whose grayscale value is less than the grayscale average value as black so as to obtain the binary image, or set the pixel whose grayscale value is greater than the grayscale average value as white, and set the pixel whose grayscale value is less than or equal to the grayscale average value as black so as to obtain the binary image.

12. The device according to claim 9, wherein the first processing module is further configured to: determine a maximum communication region through calculating a perimeter of each communication region, and cut out an image of the maximum communication region; and erode a preset edge of the image of the maximum communication region inwardly by a preset quantity of second pixels to obtain the region of interest mask image.

13. The device according to claim 10, wherein the second processing module is further configured to: determine a transition region of interest in the second grayscale image corresponding to the region of interest mask image; and perform an AND operation on the transition region of interest and the region of interest mask image so as to obtain the region of interest.

14. A device for detecting a display panel defect, comprising a processor, and a memory storing therein an instruction, wherein the instruction is executed by the processor so as to implement the method according to claim 1.

15. A non-transitory computer-readable storage medium storing therein an instruction, wherein the instruction is executed by a processor so as to implement the method according to claim 1.

16. The method according to claim 3, wherein the determining the region of interest in accordance with the region of interest mask image and the panel image comprises: determining a transition region of interest in the second grayscale image corresponding to the region of interest mask image; and performing an AND operation on the transition region of interest and the region of interest mask image so as to obtain the region of interest.

17. The method according to claim 4, wherein the determining the region of interest in accordance with the region of interest mask image and the panel image comprises: determining a transition region of interest in the second grayscale image corresponding to the region of interest mask image; and performing an AND operation on the transition region of interest and the region of interest mask image so as to obtain the region of interest.

18. The method according to claim 5, wherein the determining the region of interest in accordance with the region of interest mask image and the panel image comprises: determining a transition region of interest in the second grayscale image corresponding to the region of interest mask image; and performing an AND operation on the transition region of interest and the region of interest mask image so as to obtain the region of interest.

19. The method according to claim 2, wherein prior to performing feature identification on the region of interest, the method further comprises at least one of: performing gamma enhancement on the region of interest; filtering the region of interest; performing defective edge sharpening on the region of interest; and performing edge removal on the region of interest.

* * * * *